US012230205B2

(12) United States Patent
Yuan et al.

(10) Patent No.: US 12,230,205 B2
(45) Date of Patent: Feb. 18, 2025

(54) PIXEL DRIVE CIRCUIT, METHOD FOR TIMING CONTROL, AND DISPLAY PANEL

(71) Applicant: HKC CORPORATION LIMITED, Shenzhen (CN)

(72) Inventors: Xin Yuan, Shenzhen (CN); Xiufeng Zhou, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/352,478

(22) Filed: Jul. 14, 2023

(65) Prior Publication Data

US 2024/0321199 A1 Sep. 26, 2024

(30) Foreign Application Priority Data

Mar. 20, 2023 (CN) ......................... 202310268743.6

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0842* (2013.01); *G09G 2300/0861* (2013.01); *G09G 2310/0262* (2013.01); *G09G 2310/08* (2013.01); *G09G 2320/02* (2013.01); *G09G 2320/045* (2013.01)

(58) Field of Classification Search
CPC ......... G09G 3/3233; G09G 2300/0426; G09G 2300/0819; G09G 2300/0842; G09G 2300/0861; G09G 2310/0262; G09G 2310/08; G09G 2320/02; G09G 2320/045
See application file for complete search history.

(56) References Cited

U.S. PATENT DOCUMENTS 10,192,486 B2 * 1/2019 He ........................ G09G 3/3208
10,255,858 B2 * 4/2019 He .......................... H10K 50/82
10,665,170 B2 * 5/2020 Chen .................... G09G 3/3233
(Continued)

FOREIGN PATENT DOCUMENTS

CN 109903726 6/2019
CN 111540315 A 8/2020
(Continued)

*Primary Examiner* — William Lu
(74) *Attorney, Agent, or Firm* — Maier & Maier, PLLC

(57) ABSTRACT

A pixel drive circuit, which includes a data input circuit, a reset compensation circuit, a first switch circuit, a second switch circuit, a third switch circuit, an energy storage circuit and a light-emitting control circuit. The data input circuit is in electrical connection with a control end of the light-emitting control circuit via the energy storage circuit. The reset compensation circuit is in electrical connection with an output of the light-emitting control circuit. The first switch circuit is connected between an output of the data input circuit and an output of the reset compensation circuit. The second switch circuit is connected between an input of the light-emitting control circuit and a first power supply. The third switching circuit is connected between the control end and the input of the light-emitting control circuit. The output of the light-emitting control circuit is in electrical connection with a second power supply.

13 Claims, 3 Drawing Sheets

(56) References Cited

U.S. PATENT DOCUMENTS

| | | | | |
|---|---|---|---|---|
| 10,777,124 | B1 * | 9/2020 | Chen | G09G 3/3233 |
| 11,049,453 | B2 * | 6/2021 | Weng | G09G 3/3233 |
| 11,114,030 | B1 | 9/2021 | Lu | |
| 11,176,886 | B2 * | 11/2021 | Yuan | G09G 3/3208 |
| 11,538,402 | B2 * | 12/2022 | Yuan | G09G 3/3233 |
| 11,854,482 | B1 * | 12/2023 | Lu | G09G 3/3233 |
| 2013/0120337 | A1 * | 5/2013 | Guo | G09G 3/3208 345/76 |
| 2014/0022150 | A1 * | 1/2014 | Guo | G09G 3/3233 345/76 |
| 2014/0354522 | A1 * | 12/2014 | Chung | G09G 3/003 345/82 |
| 2015/0154906 | A1 * | 6/2015 | Chung | G09G 3/3233 345/212 |
| 2015/0287364 | A1 * | 10/2015 | Chang | G09G 3/3291 345/77 |
| 2015/0356924 | A1 * | 12/2015 | Chen | G09G 3/3291 345/77 |
| 2017/0039948 | A1 * | 2/2017 | Xu | G09G 3/3258 |
| 2018/0197458 | A1 * | 7/2018 | Xi | G09G 3/30 |
| 2019/0295463 | A1 * | 9/2019 | Ling | G09G 3/3225 |
| 2020/0234633 | A1 * | 7/2020 | Wang | G09G 3/325 |
| 2021/0082348 | A1 * | 3/2021 | Kawashima | G09G 3/3266 |
| 2021/0312864 | A1 * | 10/2021 | Zheng | G09G 3/3233 |
| 2021/0358405 | A1 * | 11/2021 | Yang | G09G 3/3233 |
| 2021/0366383 | A1 * | 11/2021 | Ma | G09G 3/3233 |
| 2022/0036820 | A1 * | 2/2022 | Liu | G09G 3/3233 |
| 2023/0215314 | A1 * | 7/2023 | Ke | G09G 3/32 345/443 |

FOREIGN PATENT DOCUMENTS

| | | | |
|---|---|---|---|
| CN | 111613180 | A | 9/2020 |
| CN | 112164375 | A | 1/2021 |
| CN | 113889041 | A | 1/2022 |
| CN | 115440161 | A | 12/2022 |
| CN | 115512656 | A | 12/2022 |
| CN | 116092430 | A | 5/2023 |
| KR | 1020130026338 | A | 3/2013 |

* cited by examiner

PIXEL DRIVE CIRCUIT, METHOD FOR TIMING CONTROL, AND DISPLAY PANEL

CROSS-REFERENCE TO RELATED APPLICATION

Pursuant to 35 U.S.C. § 119 and the Paris Convention, this application claims the benefit of Chinese Patent Application No. 202310268743.6 filed on Mar. 20, 2023, the entire content of which is incorporated herein by reference.

TECHNICAL FIELD

The present application relates to the field of display technology, and in particular, to a pixel drive circuit, a method for timing control, and a display panel.

BACKGROUND

The statements provided herein are merely background information related to the present application, and do not necessarily constitute any prior arts. Light-emitting devices, such as an organic light-emitting diode (OLED), due to their characteristics such as, thin and lightness, energy efficient, wide viewing angle, wide color gamut and high contrast, have gradually been widely used in televisions, mobile phones, notebooks and other products.

The OLED is a current-driven light-emitting device. During operation, a driving current is provided by a pixel drive circuit. When a current flows through the OLED, the OLED emits light, and the luminous intensity is determined by the current flowing through the OLED.

Due to the non-uniformity of drive thin-film transistors in the pixel drive circuit during preparation and the aging of materials, a threshold voltage of the drive thin-film transistor in the pixel drive circuit will drift, and the drifting of the threshold voltage of the drive thin-film transistor will lead to variations in the driving current of the OLED and thereby affect an image quality of the display panel.

SUMMARY

In view of this, the present application provides a pixel drive circuit, a method for timing control and a display panel, to reduce a variation of a driving current of a light-emitting device in the pixel drive circuit caused by the threshold voltage of the drive thin-film transistor, thereby improving the image quality of the display panel.

In order to achieve the above objective, in accordance with a first aspect, an embodiment of the present application provides a pixel drive circuit, which includes a data input circuit, a reset compensation circuit, a first switch circuit, a second switch circuit, a third switch circuit, an energy storage circuit and a light-emitting control circuit.

The data input circuit is in electrical connection with a control end of the light-emitting control circuit via the energy storage circuit, the data input circuit is configured to output a data voltage in the writing phase, and the energy storage circuit is configured to store electric energy.

The reset compensation circuit is in electrical connection with an output of the light-emitting control circuit, and the reset compensation circuit is configured to output a reset voltage in the reset compensation phase.

The first switch circuit is connected between an output of the data input circuit and an output of the reset compensation circuit, and the second switch circuit is connected between an input of the light-emitting control circuit and a first power supply. The third switch circuit is connected between the control end and the input of the light-emitting control circuit. The first switching circuit is switched on in the reset compensation phase and a light-emitting phase, the second switching circuit is switched on in the light-emitting phase, the third switch circuit is switched on in the reset compensation phase.

The output of the light-emitting control circuit is in electrical connection with an anode of the light-emitting device, and the light-emitting control circuit is configured to output a driving current to the light-emitting device in the light-emitting phase. A cathode of the light-emitting device is in electrical connection with a second power supply. A voltage of the second power supply is higher than or equal to the reset voltage.

As an optional implementation of the embodiment of the present application, the voltage of the second power supply is higher than the reset voltage.

As an optional implementation of the embodiment of the present application, the reset compensation circuit includes a first switch, a reset signal line, and a first scan line. A control electrode of the first switch is in electrical connection with an output of the first scan line, a first electrode of the first switch is in electrical connection with an output of the reset signal line, and a second electrode of the first switch is in electrical connection with the control end of the light-emitting control circuit via the energy storage circuit.

As an optional implementation of the embodiment of the present application, the first switch circuit includes a second switch and a first light-emitting signal line. A control electrode of the second switch is in electrical connection with an output of the first light-emitting signal line; a first electrode of the second switch is in electrical connection with the output of the data input circuit, and a second electrode of the second switch is in electrical connection with the output of the reset compensation circuit.

As an optional implementation of the embodiment of the present application, the second switch circuit includes a third switch and a second light-emitting signal line. A control electrode of the third switch is in electrical connection with an output of the second light-emitting signal line, a first electrode of the third switch is in electrical connection with the first power supply, and a second electrode of the third switch is in electrical connection with the input of the light-emitting control circuit.

As an optional implementation of the embodiment of the present application, the third switch circuit includes a fourth switch and the first scan line. A control electrode of the fourth switch is in electrical connection with the output of the first scan line, a first electrode of the fourth switch is in electrical connection with the control end of the light-emitting control circuit, and a second electrode of the fourth switch is in electrical connection with the input of the light-emitting control circuit.

As an optional implementation of the embodiment of the present application, the pixel drive circuit further includes a fourth switch circuit. An input of the fourth switch circuit is in electrical connection with the output of the reset compensation circuit and the output of the light-emitting control circuit. An output of the fourth switch circuit is in electrical connection with the anode of the light-emitting device, and the fourth switch circuit is switched on in the light-emitting phase.

As an optional implementation of the embodiment of the present application, the fourth switch circuit includes a fifth switch and the second light-emitting signal line. A control electrode of the fifth switch is in electrical connection with the output of the second light-emitting signal line, a first electrode of the fifth switch is in electrical connection with the output of the light-emitting control circuit, and a second electrode of the fifth switch is in electrical connection with the anode of the light-emitting device.

In accordance with a second aspect, an embodiment of the present application provides a method for timing control, which is applied to the pixel drive circuit according to the first aspect or any one of the first aspect, and the method includes that:

In the reset compensation phase, controlling the first scan line to output a scan signal of a first potential to the reset compensation circuit and the third switch circuit, to enable the reset compensation circuit and the third switch circuit to be switched on, and controlling the first light-emitting signal line to output a light-emitting signal of a first potential to the first switch circuit, to enable the first switch circuit to be switched on; controlling the second scan line to output a scan signal of a second potential to the data input circuit, to enable the data input circuit to be switched off, and controlling the second light-emitting signal line to output a light-emitting signal of a second potential to the second switch circuit, to enable the second switch circuit to be switched off;

In the writing phase, controlling the second scan line to output the scan signal of the first potential to the data input circuit, to enable the data input circuit to be switched on; control the first scan line to output the scan signal of the second potential to the reset compensation circuit and the third switch circuit, to enable the reset compensation circuit and the third switch circuit to be switched off, and controlling the first light-emitting signal line to output the light-emitting signal of the second potential to the first switch circuit, to enable the first switch circuit to be switched off.

In the light-emitting phase, controlling the first light-emitting signal line to output the light-emitting signal of the first potential to the first switch circuit, to enable the first switch circuit to be switched on, and controlling the second light-emitting signal line to output the light-emitting signal of the first potential to the second switch circuit, to enable the second switch circuit to be switched on; controlling the second scan line to output the scan signal of the second potential to the data input circuit, to enable the data input circuit to be switched off.

In accordance with a third aspect, an embodiment of the present application provides a display panel, which includes a plurality of pixel units, and each pixel unit includes a light-emitting device and a pixel drive circuit as described in the first aspect or any one of the first aspect.

The technical solution provided by the embodiment of the present application includes a data input circuit, a reset compensation circuit, a first switch circuit, a second switch circuit, a third switch circuit, an energy storage circuit and a light-emitting control circuit. The data input circuit is in electrical connection with the control end of the light-emitting control circuit via the energy storage circuit, the data input circuit is configured to output a data voltage in the writing phase, and the energy storage circuit is configured to store electric energy. The reset compensation circuit is in electrical connection with the output of the light-emitting control circuit, and the reset compensation circuit is configured to output a reset voltage in the reset compensation phase.

The first switch circuit is connected between the output of the data input circuit and the output of the reset compensation circuit, the second switch circuit is connected between the input of the light-emitting control circuit and the first power supply, and the third switch circuit is connected between the control end and the input of the light-emitting control circuit; the first switch circuit is switched on in the reset compensation phase and the light-emitting phase, the second switch circuit is switched on in the light-emitting phase, and the third switch circuit is switched on in the reset compensation phase. The output of the light-emitting control circuit is in electrical connection with the anode of the light-emitting device, and the light-emitting control circuit is configured to output a driving current to the light-emitting device in the light-emitting phase; the cathode of the light-emitting device is in electrical connection with the second power supply; and the voltage of the second power supply is higher than or equal to the reset voltage. In the above technical solution, in the reset compensation phase, the third switch circuit and the reset compensation circuit are switched on, and the reset voltage output from the reset compensation circuit is written into at the output of the light-emitting control circuit. Due to the high potential remaining at the control end of the luminescence control circuit in the previous light-emitting phase, the light-emitting control circuit is switched on. The high potential of the control end of the light-emitting control circuit flows to the reset compensation circuit via the third switch circuit and the light-emitting control circuit, until the potential of the control end of the light-emitting control circuit drops to the sum of the reset voltage and the threshold voltage of the light-emitting control circuit, to enable the light-emitting control circuit to be cut off. At this time, since the first switch circuit is also switched on, the voltage at the output of the data input circuit is also equal to the reset voltage. In the writing phase, the data input circuit is switched on and outputs the data voltage, and the voltage at the output of the data input circuit is changed from the reset voltage to the data voltage. Due to the coupling effect of the energy storage circuit, a variation of potential at the control end of the light-emitting control circuit is the same as that at the output of the input circuit, and the potential of the control end of the light-emitting control circuit becomes the sum of the data voltage and the threshold voltage of the light-emitting control circuit. Thus, in the light-emitting phase, the driving current of the light-emitting device is related to the data voltage and the reset voltage, and is independent from the threshold voltage of the light-emitting control circuit, so that this solution can reduce the variation of the driving current of the light-emitting device in the pixel drive circuit caused by the threshold voltage of the light-emitting control circuit, and thus the image quality of the display panel is improved.

DETAILED DESCRIPTION OF EMBODIMENTS

Embodiments of the present application are described below with reference to the drawings in the embodiments of the present application. The terms used in implementations of the embodiments of the present application are only used to explain the specific embodiments of the present application, and are not intended to limit the present application. The following specific embodiments may be combined with each other, and the same or similar concepts or processes may not be repeated in some embodiments.

The light-emitting device in the embodiments of the present application may be any one of an OLED, a quantum dot light-emitting diode (QLED) and a sub-millimeter light-emitting diode (Mini Light Emitting Diodes, Mini LED). In the following, the embodiment will take the OLED as an example for exemplary description.

Figure 1:
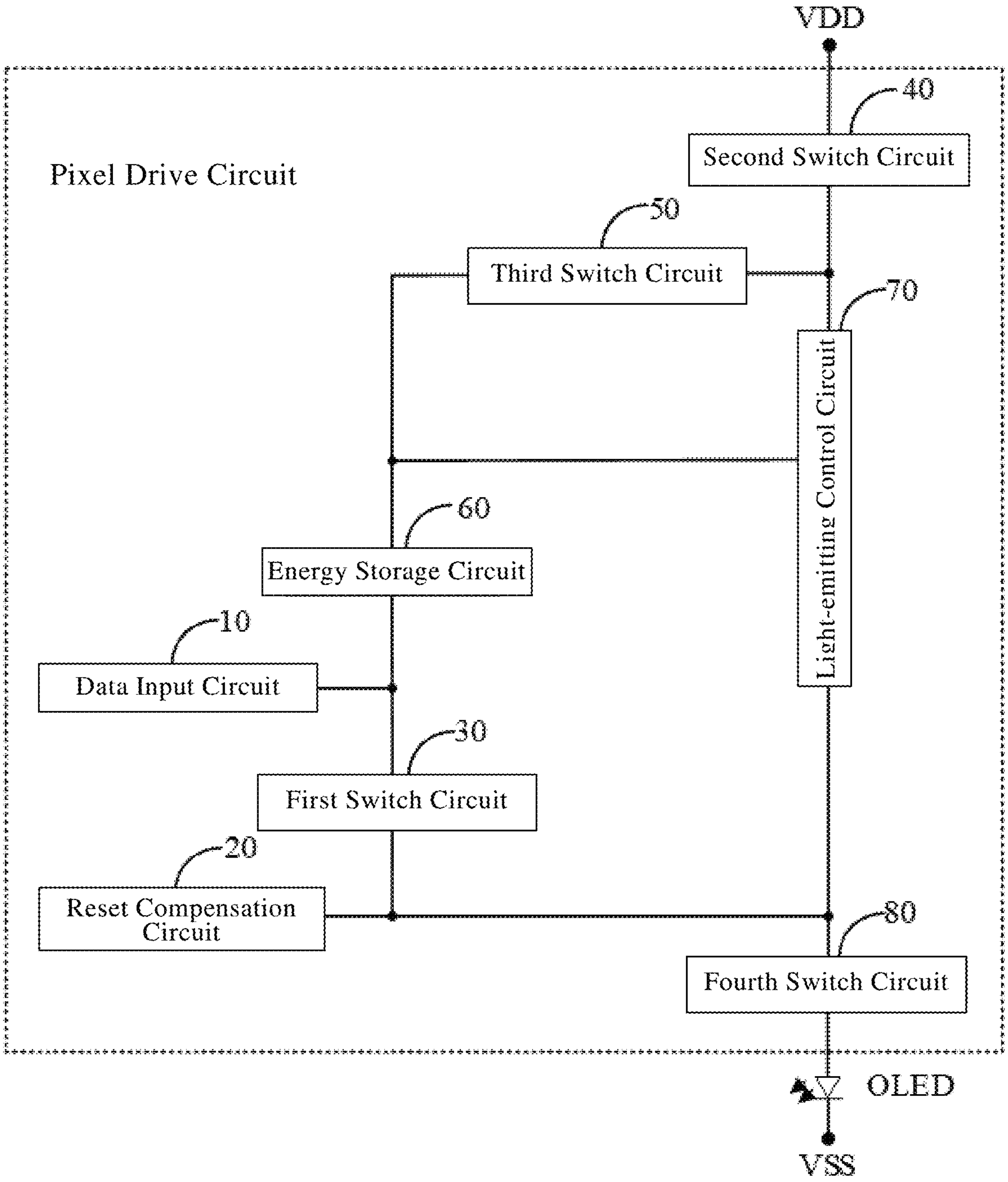
FIG. 1 is a schematic structural diagram of any pixel unit in a display panel according to an embodiment of the present application.

FIG. 1 is a schematic structural diagram of any pixel unit in a display panel provided by an embodiment of the present application. As shown in FIG. 1, the pixel unit may include: a first power supply VDD, a second power supply VSS, a pixel drive circuit and an OLED.

The first power supply VDD may output a high-potential voltage, and the second power supply VSS may output a low-potential voltage.

The pixel drive circuit may include: a data input circuit 10, a reset compensation circuit 20, a first switch circuit 30, a second switch circuit 40, a third switch circuit 50, an energy storage circuit 60 and a light-emitting control circuit 70.

The data input circuit 10 is in electrical connection with a control end of the light-emitting control circuit 70 via the energy storage circuit 60, the data input circuit 10 is configured to output a data voltage in a writing phase, and the energy storage circuit 60 is configured to store electric energy.

The reset compensation circuit 20 is in electrical connection with an output of the light-emitting control circuit 70, and the reset compensation circuit 20 is configured to output a reset voltage in a reset compensation phase.

The first switch circuit 30 is connected between an output of the data input circuit 10 and an output of the reset compensation circuit 20, and the first switch circuit 30 is switched on in the reset compensation phase and a light-emitting phase.

The second switch circuit 40 is connected between an input of the light-emitting control circuit 70 and the first power supply VDD, and the second switch circuit 40 is switched on in the light-emitting phase.

The third switch circuit 50 is connected between the control end and the input of the light-emitting control circuit 70, and the third switch circuit 50 is switched on in the reset compensation phase.

The output of the light-emitting control circuit 70 is in electrical connection with an anode of a light-emitting device, and the light-emitting control circuit 70 is configured to output a driving current to the light-emitting device in the light-emitting phase. A cathode of the light-emitting device is in electrical connection with the second power source VSS.

The voltage of the second power supply VSS may be equal to the reset voltage, so that no current will form between the reset compensation circuit 20 and the second power supply VSS (that is, at the OLED) in the reset compensation phase and the writing phase, resulting in that the OLED does not emit light in the reset compensation phase and the writing phase.

The voltage of the second power supply VSS may also be higher than the reset voltage, so that the reset compensation circuit 20 and the second power supply VSS may enabled to apply a reverse bias voltage to the OLED to consume excess electrons and holes in the OLED in the reset compensation phase and the writing phase. Therefore, in the light-emitting phase, as the excess electrons and holes in the OLED have been consumed, the luminous intensity and luminous rate of the OLED are improved, and thus the display effect is improved, and the service life of the OLED is also prolonged.

In the reset compensation phase, the third switch circuit 50 and the reset compensation circuit 20 are switched on, and the reset voltage output from the reset compensation circuit 20 is written into the output of the light-emitting control circuit 70. Due to the high potential remaining at the control end of the luminescence control circuit 70 in a previous light-emitting phase, the light-emitting control circuit 70 is switched on, and the high potential at the control end of the light-emitting control circuit 70 flows to the reset compensation circuit 20 via the third switch circuit 50 and the light-emitting control circuit 70, until the potential at the control end of the light-emitting control circuit 70 drops to a sum of the reset voltage and the threshold voltages of the light-emitting control circuit 70, which enables the light-emitting control circuit 70 to be cut off. At this time, since the first switch circuit 30 is also switched on, the voltage at the output of the data input circuit 10 is also equal to the reset voltage. In the writing phase, the data input circuit 10 is switched on and outputs the data voltage, and the voltage at the output of the data input circuit 10 is changed from the reset voltage to the data voltage. Due to a coupling effect of the energy storage circuit 60, a variation of potential at the control end of the light-emitting control circuit 70 is the same as a variation of potential at the output of the input circuit 10, and the potential of the control end of the light-emitting control circuit 70 becomes the sum of the data voltage and the threshold voltage of the light-emitting control circuit 70. Thus, in the light-emitting phase, the driving current of the light-emitting device is related to the data voltage and the reset voltage, and is independent from the threshold voltage of the light-emitting control circuit 70, so that this solution can reduce the variation of the driving current of the light-emitting device in the pixel drive circuit caused by the threshold voltage of the light-emitting control circuit 70, and thus the image quality of the display panel is improved.

In another embodiment of the present application, the pixel drive circuit may also include a fourth switch circuit 80. An input of the fourth switch circuit 80 is in electrical connection with the output of the reset compensation circuit 20 and the output of the light-emitting control circuit 70. An output of the four switch circuit 80 is in electrical connection with the anode of the light-emitting device, and the fourth switch circuit 80 is switched on in the light-emitting phase. Since the fourth switch circuit 80 is in an off state in the reset compensation phase, the high potential of the control end of the light-emitting control circuit 70 will not flow to the OLED via the third switch circuit 50 and the light-emitting control circuit 70, which avoids a formation of weak current at the OLED in the reset compensation phase, thereby prolonging the service life of the OLED and further improving the image quality of the display panel.

Figure 2:
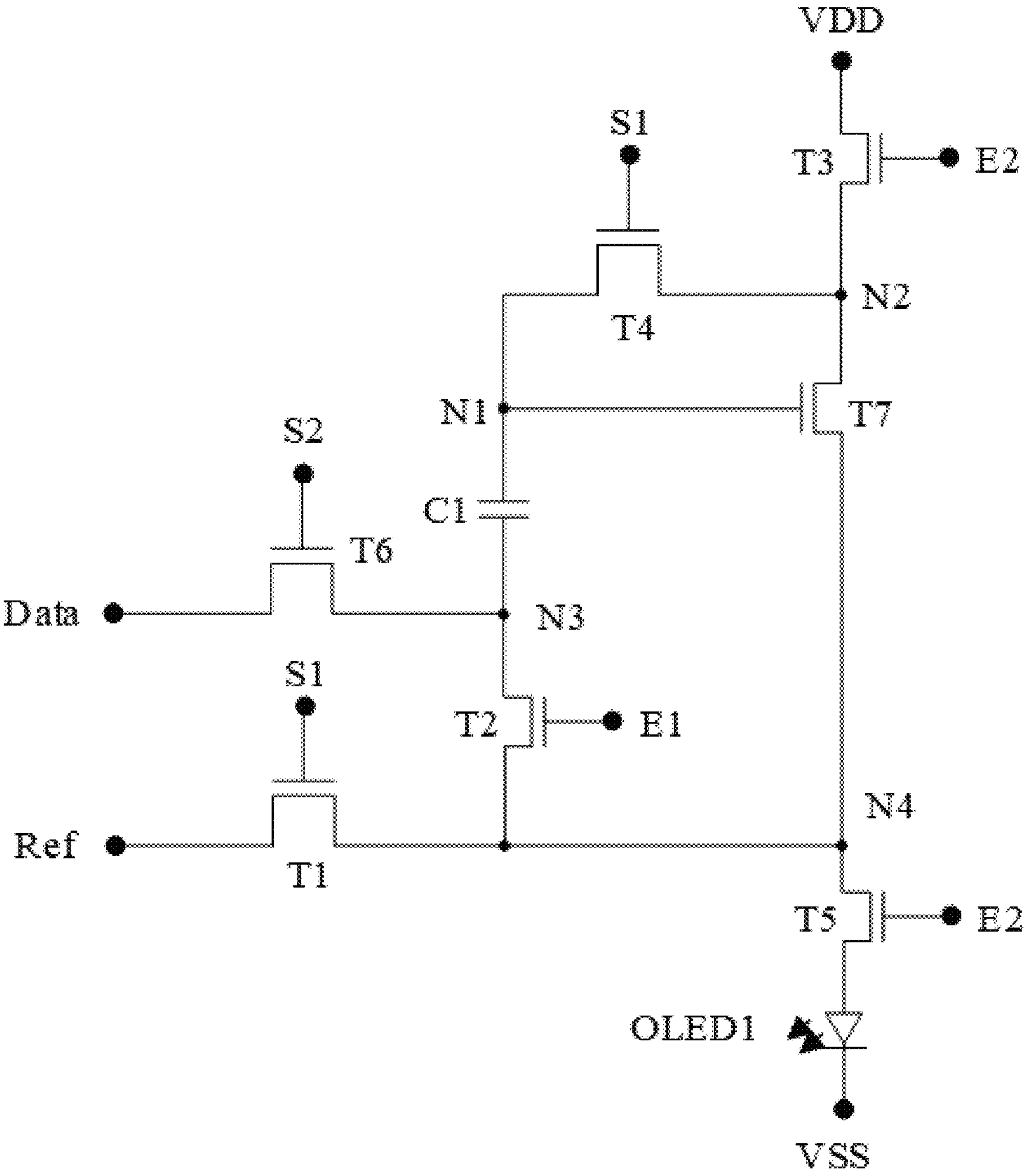
FIG. 2 is a schematic diagram of a circuit structure of a pixel drive circuit in FIG. 1.

FIG. 2 is a schematic diagram of a circuit structure of a pixel drive circuit in FIG. 1. As shown in FIG. 2, the reset compensation circuit 20 may include a first switch T1, a reset signal line Ref and a first scan line S1, and a control electrode of the first switch T1 is in electrical connection with an output of the first scan line S1, a first electrode of the first switch T1 is in electrical connection with an output of the reset signal line Ref, and a second electrode of the first switch T1 is in electrical connection with the control end of the light-emitting control circuit 70 via the energy storage circuit 60.

The first switch circuit 30 may include a second switch T2 and a first light-emitting signal line E1. A control electrode of the second switch T2 is in electrical connection with an output of the first light-emitting signal line E1, a first electrode of the second switch T2 is in electrical connection with the output of the data input circuit 10, and a second electrode of the second switch T2 is in electrical connection with the output of the reset compensation circuit 20.

The second switch circuit 40 may include a third switch T3 and a second light-emitting signal line E2. A control electrode of the third switch T3 is in electrical connection with an output of the second light-emitting signal line E2, a first electrode of the third switch T3 is in electrical connection with the first power supply VDD, and a second electrode of the third switch T3 is in electrical connection with the input of the light-emitting control circuit 70.

The third switch circuit 50 may include a fourth switch T4 and the first scan line S1. A control electrode of the fourth switch T4 is in electrical connection with the output of the first scan line S1, a first electrode of the fourth switch T4 is in electrical connection with the control end of the light-emitting control circuit 70, and a second electrode of the fourth switch T4 is in electrical connection with the input of the light-emitting control circuit 70.

The control electrodes of the first switch T1 and the fourth switch T4 may be connected to a same scan line (i.e., the first scan line S1), which can reduce the number of scan lines in the pixel drive circuit and reduce the complexity of the pixel drive circuit. When the control electrodes of the first switch T1 and the fourth switch T4 are connected to the same scan line, the first switch T1 and the fourth switch T4 are field effect thin-film transistors of the same type, for example, both are P-type field effect thin-film transistors (PMOS), or both are N-type field effect thin-film transistors (NMOS).

The control electrodes of the first switch T1 and the fourth switch T4 may also be connected to different scan lines, so that the types of the first switch T1 and the fourth switch T4 do not need to be the same type of field effect thin-film transistors, which enables a flexible selection on the P-type field effect thin film crystal or N-type field effect thin-film transistor.

The fourth switch circuit 80 may include a fifth switch T5 and the second light-emitting signal line E2, a control electrode of the fifth switch T5 is in electrical connection with the output of the second light-emitting signal line E2, a first electrode of the fifth switch T5 is in electrical connection with the output of the light-emitting control circuit 70, and a second electrode of the fifth switch T5 is in electrical connection with the anode of the light-emitting device.

The control electrodes of the third switch T3 and the fifth switch T5 may be connected to a same scan line (i.e., the second scan line S2), and at this time, the third switch T3 and the fifth switch T5 are field effect thin-film transistors of the same type. The control electrodes of the third switch T3 and the fifth switch T5 may also be connected to different scan lines, and in this case, the types of the third switch T3 and the fifth switch T5 do not need to be the same type of field effect thin-film transistors.

In this embodiment, that the control electrodes of the first switch T1 and the fourth switch T4 are connected to one scan line, and the control electrodes of the third switch T3 and the fifth switch T5 are connected to another scan line, is taken as an example for exemplary description.

The data input circuit 10 may include a sixth switch T6, a data line and the second scan line S2. A first electrode of the sixth switch T6 is in electrical connection with an output of the data line, and a second electrode of the sixth switch T6 is in electrical connection with the control end of the light-emitting control circuit 70 via the energy storage circuit 60, and a control electrode of the sixth switch T6 is in electrical connection with the output of the second scan line S2.

The first switch T1, the second switch T2, the third switch T3, the fourth switch T4, the fifth switch T5 and the sixth switch T6 may be PMOS or NMOS transistors. When the switch is a PMOS transistor, the first electrodes of the switch is the source, the second electrode of the switch is the drain, and the control electrode of the switch is the gate. When the switch is an NMOS transistor, the first electrode of the switch is the drain, and the second electrode of the switch is the source, and the control electrode of the switch is the gate. In this embodiment, that the foregoing switches are all NMOS transistors is taken as an example for exemplary description.

The light-emitting control circuit 70 may include a drive thin-film transistor T7. A first electrode of the drive thin-film transistor T7 is in electrical connection with the second electrode of the third switch T3, a second electrode of the drive thin-film transistor T7 is in electrical connection with the first electrode of the fifth switch T5, and a control electrode of the drive thin-film transistor T7 is in electrical connection with one end of the energy storage circuit 60.

The drive thin-film transistor T7 may be NMOS, and correspondingly, the first electrode of the drive thin-film transistor T7 is a drain, the second electrode of the drive thin-film transistor T7 is a source, and the control electrode of the drive thin-film transistor T7 is a gate.

The energy storage circuit 60 may include a capacitor C1, one end of the capacitor C1 is in electrical connection with the gate of the drive thin-film transistor T7, and the other end of the capacitor C1 is in electrical connection with the second electrode of the sixth switch T6 and the first electrode of the second switch T2.

An embodiment of the present application also provides a method for timing control, which is applied to the above-mentioned pixel drive circuit. The method includes that, in the reset compensation phase, the first scan line S1 is controlled to output a scan signal of the first potential to the reset compensation circuit 20 and the third switch circuit 50, to enable the reset compensation circuit 20 and the third switch circuit 50 to be switched on, and the first light-emitting signal line E1 is controlled to output a light-emitting signal of a first potential to the first switch circuit 30, to enable the first switch circuit 30 to be switched on. The second scan line S2 is controlled to output a scan signal of a second potential to the data input circuit 10, to enable the data input circuit 10 to be switched off. The second light-emitting signal line E2 is controlled to output a light-emitting signal of a second potential to the second switch circuit 40, to enabled the second switch circuit 40 to be switched off.

In the writing phase, the second scan line S2 is controlled to output the scan signal of the first potential to the data input circuit 10, to enable the data input circuit 10 to be switched on. The first scan line S1 is controlled to output the scan signal of the second potential to the reset compensation circuit 20 and the third switch circuit 50, to enable the reset compensation circuit 20 and the third switch circuit 50 to be switched off. The first light-emitting signal line E1 is controlled to output the light-emitting signal of the second potential to the first switch circuit 30, to enable the first switch circuit 30 to be switched off.

In the light-emitting phase, the first light-emitting signal line E1 is controlled to output the light-emitting signal of the first potential to the first switch circuit 30, to enable the first switch circuit 30 to be switched on. The second light-emitting signal line E2 is controlled to output a light-emitting signal of the first potential to the second switch circuit 40, to enable the second switch circuit 40 to be switched on. The second scan line S2 is controlled to output the scan signal of the second potential to the data input circuit 10, to enable the data input circuit 10 to be switched off.

The first potential may be a high potential or a low potential. In case that the first potential is a high potential, then the second potential is a low potential; and in case that the first potential is a low potential, then the second potential is a high potential.

In case that the first switch T1, the second switch T2, the third switch T3, the fourth switch T4, the fifth switch T5 and the sixth switch T6 are NMOS transistors, the first potential is a high potential, and the second potential is a low potential. In case that the first switch T1, the second switch T2, the third switch T3, the fourth switch T4, the fifth switch T5 and the sixth switch T6 are PMOS transistors, the first potential is a low potential, the second potential is a high potential. In this embodiment, that the first potential is a high potential and the second potential is a low potential, is taken as an example for exemplary description.

Figure 3:
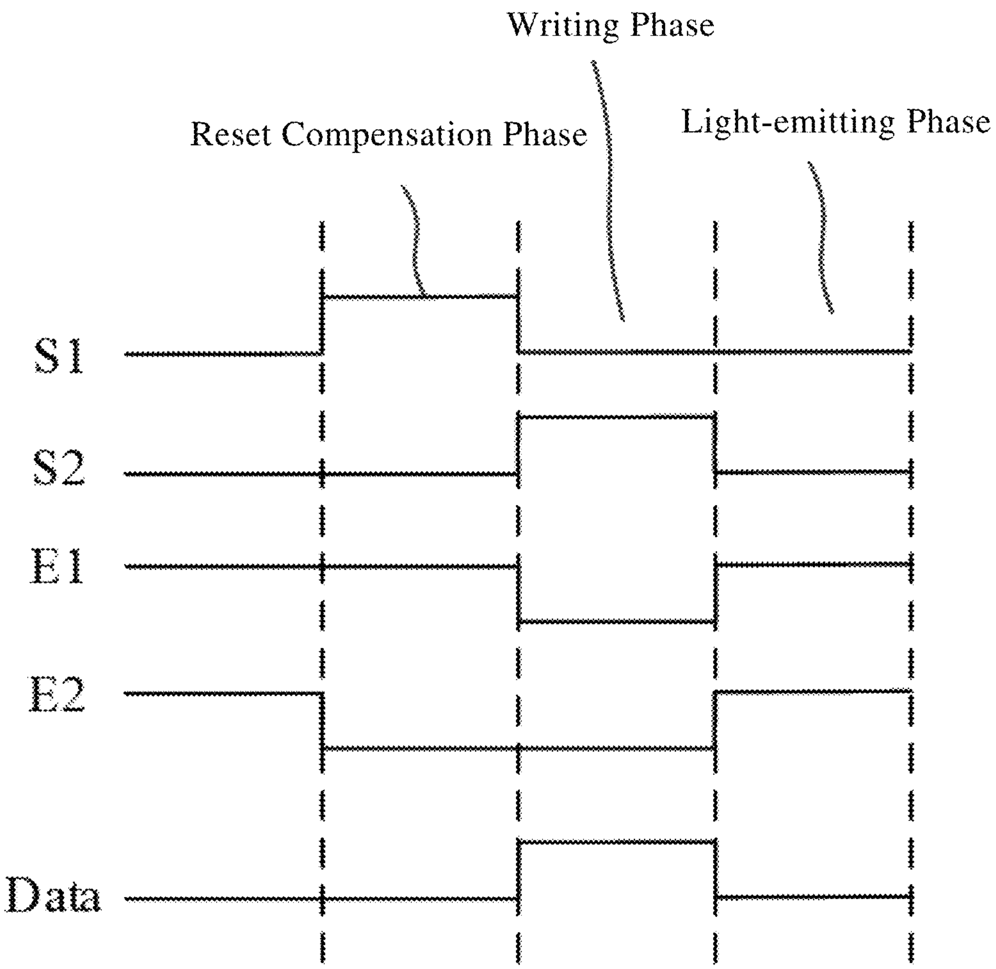
FIG. 3 is an operation timing diagram of a pixel drive circuit controlled by a method for timing control according to an embodiment of the present application.

FIG. 3 is an operation timing diagram of the pixel drive circuit controlled by the method for timing control provided by an embodiment of the present application. As shown in FIG. 3, in the reset compensation phase, the second scan line S2 outputs a low-potential scan signal, and the second light-emitting signal line E2 output a low-potential light-emitting signal, the third switch T3, the fifth switch T5 and the sixth switch T6 are switched off. The first scan line S1 outputs a high-potential scan signal, and the first light-emitting signal line E1 outputs a high-potential light-emitting signal, the first switch T1, the second switch and the fourth switch T4 are switched on. The reset voltage Vref output from the reset signal line Ref is written at Node N3 and Node N4, and meanwhile, due to the high potential remaining at Node N1 in the previous light-emitting phase, the drive thin-film transistor T7 is switched on, and the high potential at Node N1 and Node N2 flows to the reset signal line Ref via the drive thin-film transistor T7, until the potential of the gate (i.e., the Node N1) of the drive thin-film transistor T7 drops to Vref+Vth, and the drive thin-film transistor T7 is cut off. At this time, the voltages at Nodes N3 and N4 are both Vref, where, Vth is the threshold voltage of the drive thin-film transistor T7.

In the writing phase, the second scan line S2 outputs a high-potential scan signal, the first scan line S1 outputs a low-potential scan signal, and the first light-emitting signal line E1 and the second light-emitting signal line E2 output a low-potential light-emitting signal, the six switches T6 is switched on, and the other switches are all switched off. The high-potential data voltage Vdata output from the data line is written at Node N3. Due to the coupling effect of the capacitor C1, the variations of potential at both ends (i.e., Node N1 and Node N3) of the capacitor C1 are the same, the potential at Node N3 is changed from Vref to Vdata, and the potential at Node N1 is changed from Vref+Vth to Vdata+Vth.

In the light-emitting phase, the first light-emitting signal line E1 and the second light-emitting signal line E2 output a high-potential light-emitting signal, the third switch T3, the fifth switch T5 and the driving thin-film transistor T7 are switched on, and the other switches are switched off, and then the OLED emits light.

The driving current of OLED may be determined according to the following formula:

$$I_{OLED}=1/2\mu_n C_{ox} W/L(Vgs-Vth)^2$$

where, $I_{OLED}$ is the driving current of the OLED, $\mu_u$ is an electron mobility of the drive thin-film transistor T7, Cox is a capacitance per unit area of the gate oxide layer of the drive thin-film transistor T7, W/L is a width-to-length ratio of the drive thin-film transistor T7, and Vgs is a voltage of the gate of the thin-film transistor T7 with respect to the source of the drive thin-film transistor T7.

The gate-source voltage of the drive thin-film transistor T7 is that: Vgs=(Vdata+Vth)−Vref. Then, a calculation formula for the driving current of the OLED is as follows:

$$I_{OLED}=1/2\mu_n C_{ox} W/L(Vdata-Vref)^2$$

According to the above formula, the driving current of the OLED, in the pixel drive circuit provided by the present application, is only related to the data voltage and the reset voltage, and is independent from the threshold voltage Vth of the drive thin-film transistor T7, thereby the variation of the driving current of the light-emitting device in the pixel drive circuit caused by the threshold voltage of the thin-film transistor T7 can be reduced, and thus the image quality of the display panel is improved.

It can be understood that the circuit modules illustrated in the embodiments of the present application do not constitute a specific limitation on the pixel drive circuit. In other embodiments of the present application, the pixel drive circuit may include more or fewer circuit modules than that shown in the figures, or some circuit modules may be combined, or some circuit modules may be split. Each circuit module may include more or fewer devices than that shown in the figures. The illustrated circuit modules may be implemented in hardware, software or a combination of software and hardware.

The first switch circuit is connected between the output of the data input circuit and the output of the reset compensation circuit, the second switch circuit is connected between the input of the light-emitting control circuit and the first power supply, and the third switch circuit is connected between the control end and the input of the light-emitting control circuit; the first switch circuit is switched on in the reset compensation phase and the light-emitting phase, the second switch circuit is switched on in the light-emitting phase, and the third switch circuit is switched on in the reset compensation phase. The output of the light-emitting control circuit is in electrical connection with the anode of the light-emitting device, and the light-emitting control circuit is configured to output a driving current to the light-emitting device in the light-emitting phase; the cathode of the light-emitting device is in electrical connection with the second power supply; and the voltage of the second power supply is higher than or equal to the reset voltage. In the above technical solution, in the reset compensation phase, the third switch circuit and the reset compensation circuit are switched on, and the reset voltage output from the reset compensation circuit is written into at the output of the light-emitting control circuit. Due to the high potential remaining at the control end of the luminescence control circuit in the previous light-emitting phase, the light-emitting control circuit is switched on. The high potential of the control end of the light-emitting control circuit flows to the reset compensation circuit via the third switch circuit and the light-emitting control circuit, until the potential of the control end of the light-emitting control circuit drops to the sum of the reset voltage and the threshold voltage of the light-emitting control circuit, to enable the light-emitting control circuit to be cut off. At this time, since the first switch circuit is also switched on, the voltage at the output of the data input circuit is also equal to the reset voltage. In the writing phase, the data input circuit is switched on and outputs the data voltage, and the voltage at the output of the data input circuit is changed from the reset voltage to the data voltage. Due to the coupling effect of the energy storage circuit, a variation of potential at the control end of the light-emitting control circuit is the same as that at the output of the input circuit, and the potential of the control end of the light-emitting control circuit becomes the sum of the data voltage and the threshold voltage of the light-emitting control circuit. Thus, in the light-emitting phase, the driving current of the light-emitting device is related to the data voltage and the reset voltage, and is independent from the threshold voltage of the light-emitting control circuit, so that this solution can reduce the variation of the driving current of the light-emitting device in the pixel drive circuit caused by the threshold voltage of the light-emitting control circuit, and thus the image quality of the display panel is improved.

In the above embodiments, the descriptions of each embodiment have their own emphases, and for parts that are not detailed or recorded in a certain embodiment, references may be made to the relevant descriptions of other embodiments.

In addition, the size ratio relationship among the various components in the drawings is only schematic, which may not necessarily reflect the actual size ratio relationship between the various components.

In the description of this application, orientations or positional relationships indicated by terms such as "central", "longitudinal", "transverse", "upper", "lower", "front", "rear", "left", "right", "vertical", "horizontal", "top", "bottom", "inner", "outer", etc., are based on the orientations or positional relationships shown in the drawings, which are only used for the convenience of describing the present application and simplifying the description, rather than indicating or implying that a device or element referred to must have a particular orientation, be constructed, and operated in a particular orientation, and thus should not be construed as limiting the present application.

In the description of the present application, it should be noted that unless otherwise specified and limited, the terms "installation", "in connection with", and "connected to" should be understood in a broad sense, for example, it may be a fixed connection, a detachable connection, or an integration; it may be a mechanical connection or an electrical connection; it may be directly connected or indirectly connected through an intermediary, and it may also be an internal communication of two components. Those of ordinary skills in the art can understand the specific meanings of the above terms in the present application based on specific situations.

It should be understood that the term "comprising", when used in the specification and claims of the present application, indicates a presence of described features, integers, steps, operations, elements and/or components, but does not exclude the presence or addition of one or more other features, wholes, steps, operations, elements, components and/or combinations thereof.

In the description of the present application, unless otherwise specified, "/" means that the objects associated with each other are an "or" relationship, for example, A/B may mean A or B. the expression "and/or" in the present application is only an association relationship describing associated objects, which means that three kinds of relationships may be included, for example, A and/or B, may include three cases, that is, A exists alone, both A and B exist, and B exists alone, among which A, B C may be singular or plural.

In addition, in the description of the present application, unless otherwise specified, the phrase "a plurality of" means two or more than two. "at least one of the following" or similar expressions refer to any combination of these items, including any combination of single items or plural items. For example, at least one of a, b, or c may include that: a, b, c, a-b, a-c, b-c, or a-b-c, wherein a, b, c may be singular or plural.

In addition, in the description of the specification and the appended claims of the present application, the terms "first", "second", "third" and so on are used to distinguish similar objects, and are not necessarily used to describe a specific order or sequence order. It should be understood that the terms used in this way are interchangeable under appropriate circumstances such that the embodiments described herein can be practiced in other orders other than those illustrated or described herein.

References to "one embodiment" or "some embodiments" or the like described in the specification of the present application mean that a particular feature, structure or characteristic described in connection with that embodiment is included in one or more embodiments of the present application. Thus, appearances of the phrases "in one embodiment," "in some embodiments," "in other embodiments," "in some other embodiments," etc. in various places in this specification are not necessarily all refer to the same embodiment, but mean "one or more but not all embodiments" unless specifically stated otherwise.

Finally, it should be noted that: the above embodiments are only used to illustrate the technical solutions of the present application, and are not intended to limit the present application. Although the present application has been described in detail with reference to the foregoing embodiments, those of ordinary skills in the art should understand that the technical solutions described in the foregoing embodiments may still be modified, or some or all of the technical features thereof may be equivalently replaced; and these modifications or replacements do not make the essence of the corresponding technical solutions deviate from the scope pf the technical solutions of the various embodiments of the present application.

What is claimed is:

1. A pixel drive circuit, comprising: a data input circuit, a reset compensation circuit, a first switch circuit, a second switch circuit, a third switch circuit, an energy storage circuit and a light-emitting control circuit;

wherein the data input circuit is in electrical connection with a control end of the light-emitting control circuit via the energy storage circuit, the data input circuit is configured to output a data voltage in a writing phase, and the energy storage circuit is configured to store electric energy;

the reset compensation circuit is in electrical connection with an output of the light-emitting control circuit, and the reset compensation circuit is configured to output a reset voltage in a reset compensation phase;

the first switch circuit is connected between an output of the data input circuit and an output of the reset compensation circuit, and the second switch circuit is connected between an input of the light-emitting control circuit and a first power supply, the third switch circuit is connected between the control end and the input of the light-emitting control circuit; the first switching circuit is switched on in the reset compensation phase and a light-emitting phase, and the second switching circuit is switched on in the light-emitting phase, the third switch circuit is switched on in the reset compensation phase;

the output of the light-emitting control circuit is in electrical connection with an anode of a light-emitting device, and the light-emitting control circuit is configured to output a driving current to the light-emitting device in the light-emitting phase; a cathode of the light-emitting device is in electrical connection with a second power supply; and a voltage of the second power supply is higher than or equal to the reset voltage; and a fourth switch circuit, and an input of the fourth switch circuit is in electrical connection with the output of the reset compensation circuit and the output of the light-emitting control circuit, an output of the fourth switch circuit is in electrical connection with the anode of the light-emitting device, and the fourth switch circuit is switched on in the light-emitting phase.

2. The pixel drive circuit according to claim 1, wherein the reset compensation circuit comprises a first switch, a reset signal line and a first scan line, a control electrode of the first switch is in electrical connection with an output of the first scan line, a first electrode of the first switch is in electrical connection with an output of the reset signal line, and a second electrode of the first switch is in electrical connection with the control end of the light-emitting control circuit via the energy storage circuit.

3. The pixel drive circuit according to claim 1, wherein the first switch circuit comprises a second switch and a first light-emitting signal line, and a control electrode of the second switch is in electrical connection with an output of the first light-emitting signal line, a first electrode of the second switch is in electrical connection with the output of the data input circuit, and a second electrode of the second switch is in electrical connection with the output of the reset compensation circuit.

4. The pixel drive circuit according to claim 1, wherein the second switch circuit comprises a third switch and a second light-emitting signal line, and a control electrode of the third switch is in electrical connection with an output of the second light-emitting signal line, a first electrode of the third switch is in electrical connection with the first power supply, and a second electrode of the third switch is in electrical connection with the input of the light-emitting control circuit.

5. The pixel drive circuit according to claim 1, wherein the third switch circuit comprises a fourth switch and a first scan line, and a control electrode of the fourth switch is in electrical connection with an output of the first scan line, a first electrode of the fourth switch is in electrical connection with the control end of the light-emitting control circuit, and a second electrode of the fourth switch is in electrical connection with the input of the light-emitting control circuit.

6. The pixel drive circuit according to claim 1, wherein the fourth switch circuit comprises a fifth switch and a second light-emitting signal line, and a control electrode of the fifth switch is in electrical connection with an output of the second light-emitting signal line, a first electrode of the fifth switch is in electrical connection with the output of the light-emitting control circuit, and a second electrode of the fifth switch is in electrical connection with the anode of the light-emitting device.

7. A method for timing control, being applied to a pixel drive circuit the pixel drive circuit comprising:

a data input circuit, a reset compensation circuit, a first switch circuit, a second switch circuit, a third switch circuit, an energy storage circuit and a light-emitting control circuit;

wherein the data input circuit is in electrical connection with a control end of the light-emitting control circuit via the energy storage circuit, the data input circuit is configured to output a data voltage in a writing phase, and the energy storage circuit is configured to store electric energy;

the reset compensation circuit is in electrical connection with an output of the light-emitting control circuit, and the reset compensation circuit is configured to output a reset voltage in a reset compensation phase;

the first switch circuit is connected between an output of the data input circuit and an output of the reset compensation circuit, and the second switch circuit is connected between an input of the light-emitting control circuit and a first power supply, the third switch circuit is connected between the control end and the input of the light-emitting control circuit; the first switching circuit is switched on in the reset compensation phase and a light-emitting phase, and the second switching circuit is switched on in the light-emitting phase, the third switch circuit is switched on in the reset compensation phase; and the output of the light-emitting control circuit is in electrical connection with an anode of a light-emitting device, and the light-emitting control circuit is configured to output a driving current to the light-emitting device in the light-emitting phase; a cathode of the light-emitting device is in electrical connection with a second power supply; and a voltage of the second power supply is higher than or equal to the reset voltage, and the method comprising:

controlling, in the reset compensation phase, the first scan line to output a scan signal of a first potential to the reset compensation circuit and the third switch circuit, to enable the reset compensation circuit and the third switch circuit to be switched on, and controlling the first light-emitting signal line to output a light-emitting signal of a first potential to the first switch circuit, to enable the first switch circuit to be switched on; controlling the second scan line to output a scan signal of a second potential to the data input circuit, to enable the data input circuit to be switched off, and controlling the second light-emitting signal line to output a light-emitting signal of a second potential to the second switch circuit, to enable the second switch circuit to be switched off;

controlling, in the writing phase, the second scan line to output the scan signal of the first potential to the data input circuit, to enable the data input circuit to be switched on; control the first scan line to output the scan signal of the second potential to the reset compensation circuit and the third switch circuit, to enable the reset compensation circuit and the third switch circuit to be switched off, and controlling the first light-emitting signal line to output the light-emitting signal of the second potential to the first switch circuit, to enable the first switch circuit to be switched off; and controlling, in the light-emitting phase, the first light-emitting signal line to output the light-emitting signal of the first potential to the first switch circuit, to enable the first switch circuit to be switched on, and controlling the second light-emitting signal line to output the light-emitting signal of the first potential to the second switch circuit, to enable the second switch circuit to be switched on; controlling the second scan line to output the scan signal of the second potential to the data input circuit, to enable the data input circuit to be switched off.

8. A display panel, comprising:

a plurality of pixel units, each pixel unit comprising:

a light-emitting device; and a pixel drive circuit, comprising:

a data input circuit, a reset compensation circuit, a first switch circuit, a second switch circuit, a third switch circuit, an energy storage circuit and a light-emitting control circuit;

wherein the data input circuit is in electrical connection with a control end of the light-emitting control circuit via the energy storage circuit, the data input circuit is configured to output a data voltage in a writing phase, and the energy storage circuit is configured to store electric energy;

the reset compensation circuit is in electrical connection with an output of the light-emitting control circuit, and the reset compensation circuit is configured to output a reset voltage in a reset compensation phase;

the first switch circuit is connected between an output of the data input circuit and an output of the reset compensation circuit, and the second switch circuit is connected between an input of the light-emitting control circuit and a first power supply, the third switch circuit is connected between the control end and the input of the light-emitting control circuit; the first switching circuit is switched on in the reset compensation phase and a light-emitting phase, and the second switching circuit is switched on in the light-emitting phase, the third switch circuit is switched on in the reset compensation phase;

the output of the light-emitting control circuit is in electrical connection with an anode of a light-emitting device, and the light-emitting control circuit is configured to output a driving current to the light-emitting device in the light-emitting phase; a cathode of the light-emitting device is in electrical connection with a second power supply; and a voltage of the second power supply is higher than or equal to the reset voltage; and the pixel drive circuit further comprises: a fourth switch circuit, and an input of the fourth switch circuit is in electrical connection with the output of the reset compensation circuit and the output of the light-emitting control circuit, an output of the fourth switch circuit is in electrical connection with the anode of the light-emitting device, and the fourth switch circuit is switched on in the light-emitting phase.

9. The display panel according to claim 8, wherein the reset compensation circuit comprises a first switch, a reset signal line and a first scan line, and a control electrode of the first switch is in electrical connection with an output of the first scan line, a first electrode of the first switch is in electrical connection with an output of the reset signal line, and a second electrode of the first switch is in electrical connection with the control end of the light-emitting control circuit via the energy storage circuit.

10. The display panel according to claim 8, wherein the first switch circuit comprises a second switch and a first light-emitting signal line, and a control electrode of the second switch is in electrical connection with an output of the first light-emitting signal line, a first electrode of the second switch is in electrical connection with the output of the data input circuit, and a second electrode of the second switch is in electrical connection with the output of the reset compensation circuit.

11. The display panel according to claim 8, wherein the second switch circuit comprises a third switch and a second light-emitting signal line, and a control electrode of the third switch is in electrical connection with an output of the second light-emitting signal line, a first electrode of the third switch is in electrical connection with the first power supply, and a second electrode of the third switch is in electrical connection with the input of the light-emitting control circuit.

12. The display panel according to claim 8, wherein the third switch circuit comprises a fourth switch and a first scan line, and a control electrode of the fourth switch is in electrical connection with an output of the first scan line, a first electrode of the fourth switch is in electrical connection with the control end of the light-emitting control circuit, and a second electrode of the fourth switch is in electrical connection with the input of the light-emitting control circuit.

13. The display panel according to claim 8, wherein the fourth switch circuit comprises a fifth switch and a second light-emitting signal line, and a control electrode of the fifth switch is in electrical connection with an output of the second light-emitting signal line, a first electrode of the fifth switch is in electrical connection with the output of the light-emitting control circuit, and a second electrode of the fifth switch is in electrical connection with the anode of the light-emitting device.

* * * * *